US011531696B2

(12) United States Patent
Curcio Lindström et al.

(10) Patent No.: US 11,531,696 B2
(45) Date of Patent: Dec. 20, 2022

(54) COMMUNICATING SHUFFLED MEDIA CONTENT

(71) Applicant: Spotify AB, Stockholm (SE)

(72) Inventors: Erik Johan Curcio Lindström, Stockholm (SE); Sven Samuel Erdtman, Uppsala (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 16/932,562

(22) Filed: Jul. 17, 2020

(65) Prior Publication Data

US 2022/0019612 A1  Jan. 20, 2022

(51) Int. Cl.
*G06F 16/438* (2019.01)
*H04N 21/436* (2011.01)
*G06F 3/0482* (2013.01)

(52) U.S. Cl.
CPC ........ *G06F 16/4387* (2019.01); *G06F 3/0482* (2013.01); *H04N 21/43615* (2013.01)

(58) Field of Classification Search
CPC .............. G06F 16/4387; G06F 3/0482; H04N 21/43615
See application file for complete search history.

(56) References Cited

U.S. PATENT DOCUMENTS

| | | | |
|---|---|---|---|
| 2010/0094880 A1* | 4/2010 | Rogers | G06F 16/4387 707/752 |
| 2011/0167128 A1 | 7/2011 | Raghunathan et al. | |
| 2017/0032256 A1* | 2/2017 | Otto | H04L 67/22 |
| 2017/0244770 A1* | 8/2017 | Eckerdal | G06F 16/4387 |
| 2017/0279914 A1 | 9/2017 | Bishop et al. | |
| 2019/0342419 A1 | 11/2019 | Bromand et al. | |
| 2020/0050953 A1* | 2/2020 | Fischbacher | G06F 8/10 |
| 2020/0264844 A1* | 8/2020 | Lindstrom | G06F 16/4387 |
| 2021/0084086 A1* | 3/2021 | Eckerdal | G06F 16/639 |

* cited by examiner

*Primary Examiner* — Seth A Silverman

(74) *Attorney, Agent, or Firm* — Merchant & Gould P.C.

(57) ABSTRACT

A method for communicating a playback order for a plurality of media content items to a user device operating in an online mode, the method performed at a server system and comprising receiving an indication that the user device will enter an offline mode, generating a playback order for the plurality of media content items, and transmitting the generated playback order to the user device before the user device enters the offline mode.

14 Claims, 6 Drawing Sheets

COMMUNICATING SHUFFLED MEDIA CONTENT

BACKGROUND

In modern media content environments which support playlists of media content items, such as songs, music, videos, or other types of media content, a user may want the content in a playback session to be shuffled. For example, a user may wish to consume content in a shuffled order within an artist page or a playlist, to provide a play order of the media content items that is different from a suggested or stored order.

One way of providing shuffled content is to use a shuffle algorithm. A shuffle algorithm takes an input seed and, based on the seed, generates a playback order for a list of media content items that are to be shuffled. The seed is often a random number that produces the same order of content every time it is applied to the shuffle algorithm. When devices have the algorithm installed, all they need to do is apply the relevant seed and a list of the content to the algorithm in order to generate the correctly ordered list.

The shuffle algorithm itself is complex and is regularly updated for optimization reasons. For a user device to benefit from the latest algorithm, it needs to be online where the algorithm can be implemented remotely, or needs to have received and installed the latest update. If a user device is offline, or in an area of low connectivity, it may not be possible for the device to receive the latest update. Even if a user device is online, the updating process itself can be a computationally expensive task, as the update must be transmitted to and stored on the device. Furthermore, some user devices may not have optimal processing capabilities to run the algorithm efficiently once it has been updated. For these reasons, it may be problematic for user devices to generate shuffled orders of media content using the latest algorithm.

It is therefore desired to find a method of generating a shuffled order of media content that solves one or more of the above problems.

SUMMARY

In general terms, This disclosure relates to communicating a playback order of media content. In particular, it relates to a method for communicating a shuffled list of media content items in a particular order for offline playback.

In accordance with an aspect of the disclosure, there is provided a method for communicating a playback order for a plurality of media content items to a user device operating in an online mode, the method performed at a server system and comprising receiving an indication that the user device will enter an offline mode; generating a playback order for the plurality of media content items; and transmitting the generated playback order to the user device before the user device enters the offline mode.

Optionally, the indication that the user device will enter the offline mode is received from the user device. Optionally, the indication the user device will enter the offline mode is based on a user input to the user device. Optionally, the user input is a request to download the plurality of media content items.

Optionally, receiving the indication that the user device will enter the offline mode comprises predicting that the user device will enter the offline mode. Optionally, predicting that the user device will enter the offline mode comprises predicting that the user device will enter a region of low connectivity.

Optionally, generating the playback order comprises using a shuffle algorithm. Optionally, using the shuffle algorithm comprises applying a seed and a reference to the plurality of media content items to the shuffle algorithm. Optionally, transmitting the generated playback order to the user device further comprises transmitting the seed.

Optionally, transmitting the generated playback order to the user device comprises transmitting a list of the plurality of media content items and an index describing the generated playback order.

Optionally, transmitting the generated playback order to the user device is performed in response to receiving the indication that the user device will enter the offline mode. Optionally, generating the playback order for the plurality of media content items is performed in response to receiving the indication that the user device will enter the offline mode.

Optionally, the user device is a smartphone, a smartwatch, a portable media player, a tablet, or a laptop computer.

In accordance with an aspect of the disclosure, there is provided a computer-readable medium having stored thereon instructions that, when executed by one or more processors cause execution of the method.

In accordance with an aspect of the disclosure, there is provided a server system for communicating a playback order for a plurality of media content items to a user device, the server system comprising a processing device, a computer-readable storage device, and a communication device, the computer-readable storage device storing data instructions that, when executed by the processing device, cause the processing device to receive an indication that the user device will enter the offline mode; generate a playback order for the plurality of media content items; and transmit the generated playback order to the user device before the user device enters the offline mode.

Optionally, the server system is configured to receive the indication that the user device will enter the offline mode from the user device. Optionally, the indication the user device will enter the offline mode is based on a user input to the user device. Optionally, the user input is a request to download the plurality of media content items.

Optionally, the server system is configured to receive an indication that the user device will enter the offline mode by. Optionally, the server system is configured to predict that that the user device will enter the offline mode by predicting that the user device will enter a region of low connectivity.

Optionally, the server system is configured to generate the playback order using a shuffle algorithm. Optionally, the server system is configured to generate the playback order using a shuffle algorithm by applying a seed and a reference to the plurality of media content items to the shuffle algorithm. Optionally, the server system is further configured to transmit the seed to the user device before the user device enters the offline mode.

Optionally, the server system is configured to transmit the generated playback order to the user device by transmitting a list of the plurality of media content items and an index describing the generated playback order to the user device.

Optionally, the server system is configured to transmit the generated playback order to the user device in response to receiving the indication that the user device will enter the offline mode. Optionally, the server system is configured to generate the playback order for the plurality of media content items in response to receiving the indication that the user device will enter the offline mode.

Optionally, the user device is a smartphone, a smartwatch, a portable media player, a tablet, or a laptop computer.

In accordance with an aspect of the disclosure, there is provided a method of playing a plurality of media content items on a user device, the method comprising: operating in an online mode, and while operating in the online mode: sending an offlining indication to a server system using the communication device, the offlining indication containing data indicative that the user device will enter an offline mode; and receiving from the server system a playback order for a plurality of media content items; and entering the offline mode after receiving the playback order, and while operating in the offline mode: initiating playback of the plurality of media content items based on the playback order.

DETAILED DESCRIPTION

Figure 1:
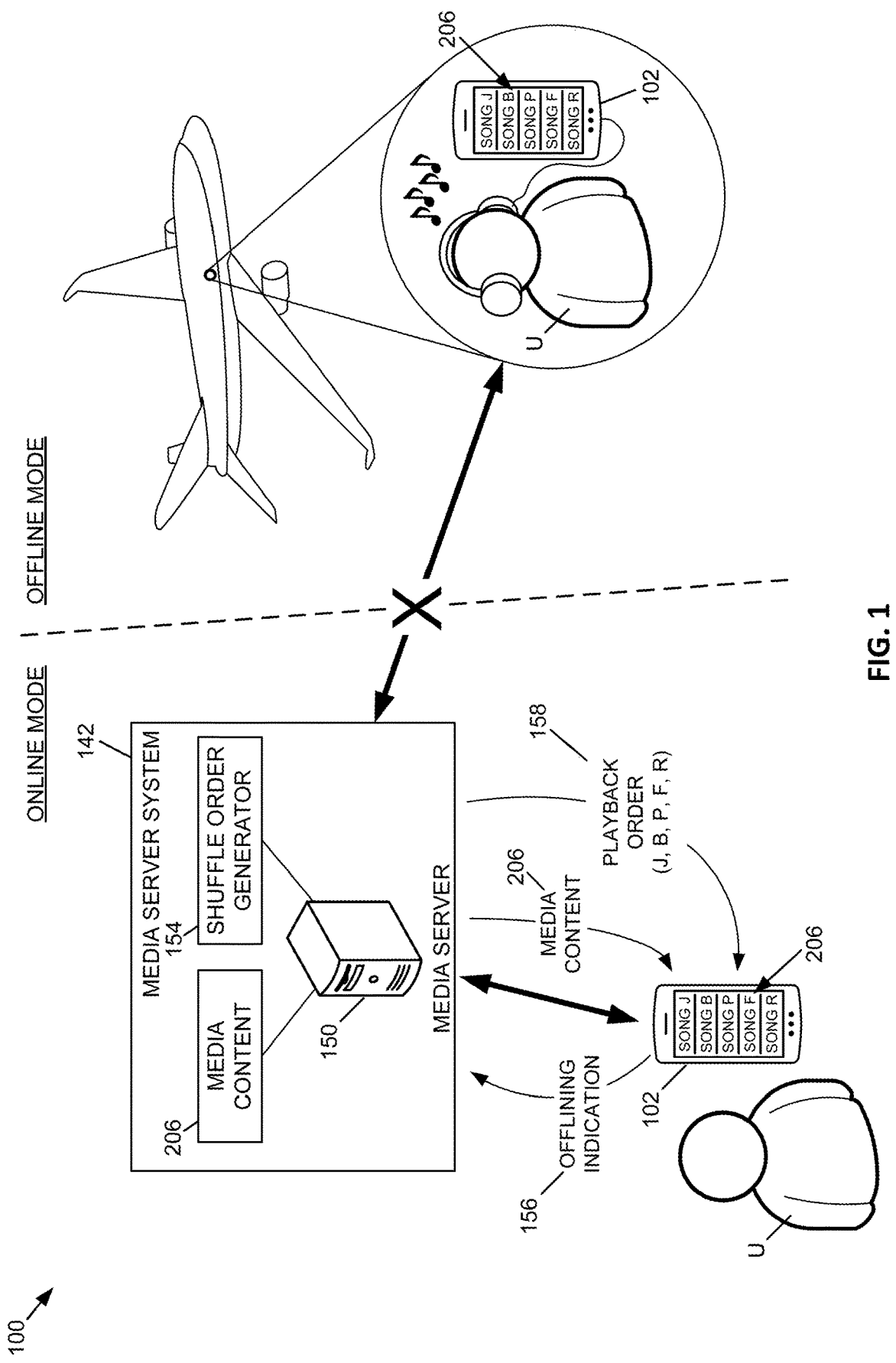
FIG. 1 is a schematic block diagram illustrating an example media-playback system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure attempts to mitigate at least some of the issues noted above by sending one or more predefined sequences for a set of media content items to a user device before the user device goes offline. The shuffle algorithm is implemented at a server, and one or more resulting orders are generated. It can then be ensured that the most up-to-date shuffle algorithm is used, and the need to download and install the latest algorithm at the user device is removed. The orders generated at the server can then be sent to the user device when the device is still online, for example during an "offlining" stage when the user device is preparing to go offline. This allows the user device to recreate the shuffled orders, and play back the media content accordingly, without running the algorithm locally and without having to be online. A track list and a set of indices may be sent corresponding to each generated order, rather than sending the tracks themselves, which reduces transmission time and bandwidth requirements. In some cases, a respective seed associated with each order is also sent to the user device for use with devices that already have the shuffle algorithm installed. Preparation for the user device to go offline can be triggered by a user request (e.g., a request to download media content before a flight or a run) or based on a prediction of an offline state (e.g., predicting areas of low connectivity along a route to be taken by the user device).

FIG. 1 is a schematic block diagram of an example media-playback system 100 for providing and playing media content 206. In this example the system 100 begins operating in an online mode and then transitions to operating in an offline mode. In the illustrated example, the media-playback system 100 includes a user device 102 and a media server system 142. The example media server system 142 includes a media server 150. The example media server 150 includes media content 206 and a shuffle order generator 154. Also shown are a user U, an offlining indication 156, and a playback order 158.

This example illustrates the media-playback system 100 operating in both the online mode and the offline mode. For example, prior to entering the offline mode, preparations are made to ensure that the user U can listen to media content while in the offline mode.

In this example, the media server system 142 may at least initially store the media content 206. The media server system 142 also includes a shuffle order generator that determines a playback order for a plurality of the media content items 206.

In some embodiments, before entering the offline mode, the user device 102 sends an offlining indication 156 to the media server system 142 using a communication device. The offlining indication 156 contains data indicative that the user device will enter the offline mode. Examples of the offlining indication 156 are described in more detail herein, such as with reference to step 402, shown in FIG. 5.

Upon receiving the offlining indication 156, the media server system 142 determines that the user device 102 will enter the offline mode, and therefore begins preparations for same. For example, if media content items 206 have not yet been downloaded onto the user device, the media server system 142 can transmit a plurality of the media content items 206 to the user device 102. But if the media content items 206 are already stored, or if the user device 102 can obtain the media content items 206 from another source, then transmission of the media content items 206 may not be needed.

The media server system 142 also utilizes the shuffle order generator 154 to generate a playback order 158 for the plurality of media content items 206. An example of the operation of the shuffle order generator 154 is illustrated and described in more detail with reference to step 404 shown in FIG. 5. In some embodiments the shuffle order generator 154 utilizes a shuffle algorithm. Examples of the shuffle algorithm are described in more detail herein.

The generated playback order 158 is then transmitted to the user device 102 before the user device 102 enters the offline mode. An example of the transmission of the playback order 158 to the user device is illustrated and described in more detail with reference to step 406 shown in FIG. 5.

In the example shown in FIG. 1, the plurality of media content items include a plurality of songs, including Song B, Song F, Song J, Song P, and Song R. The shuffle order generator 154 generates the playback order 158, identifying the playback order of the plurality of songs, namely: Song J, Song B, Song P, Song F, and then Song R.

The user device 102 then enters the offline mode after receiving the playback order 158. While operating in the offline mode, the user device 102 can then initiate playback of the plurality of media content items 206 based on the playback order 158, even though, for example, it is not able to communicate with the shuffle order generator 154 because it is in the offline mode.

Figure 2:
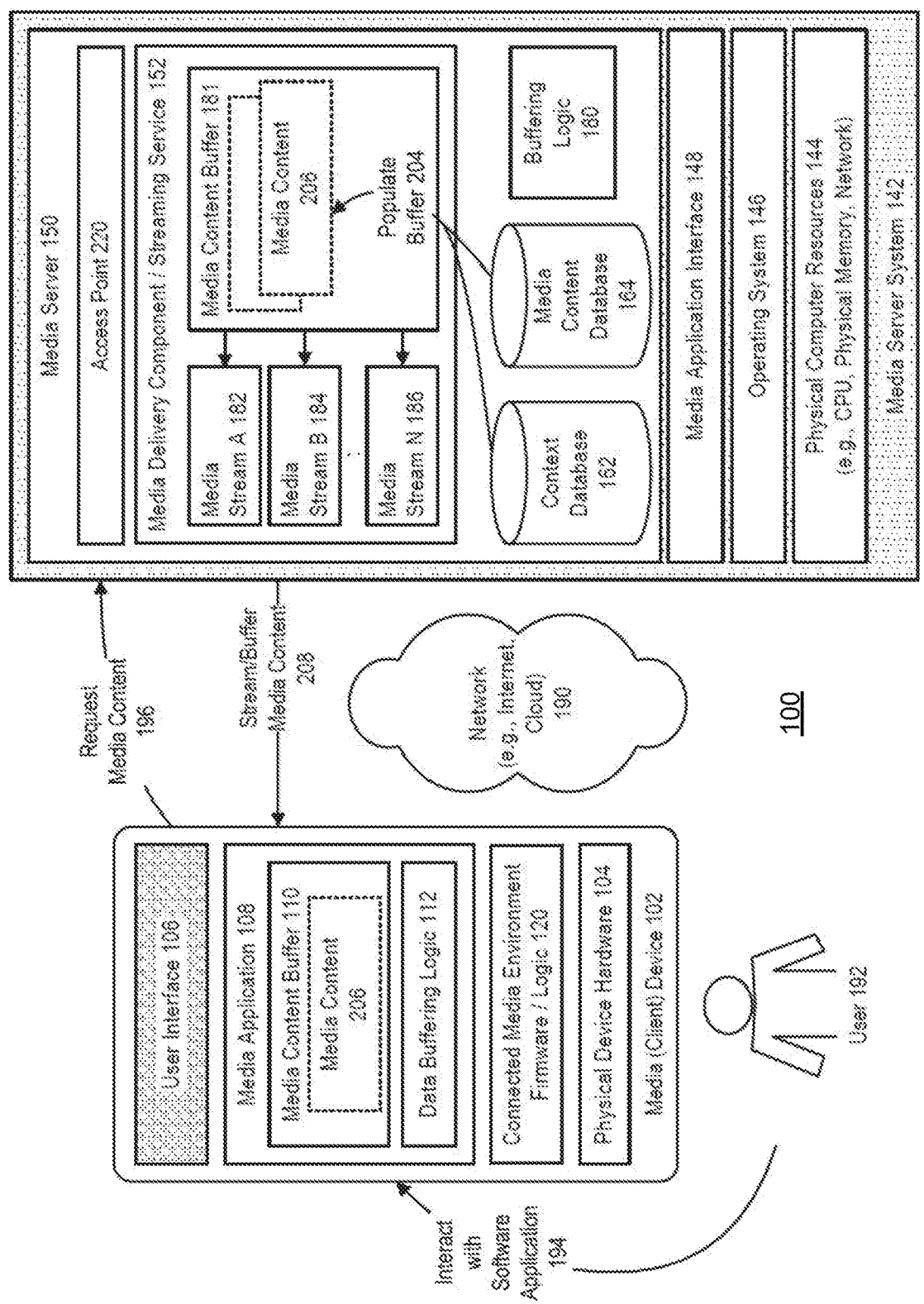
FIG. 2 illustrates another example of the media-playback system, in accordance with an embodiment.

FIG. 2 illustrates an example of a media-playback system 100 for providing and playing media content. In this example, the system 100 includes a media device 102, operating as a client device, which can receive and play media content provided by a backend media server system 142 (media server), or by another system or peer device.

In accordance with an embodiment, the client device can be, for example, a personal computer system, handheld entertainment device, tablet device, smartphone, television, audio speaker (including a smart speaker), in-car entertainment system, or other type of electronic or media device that is adapted or able to prepare a media content for presentation, control the presentation of media content, and/or play or otherwise present media content. In accordance with an embodiment, each of the client device and the media server can include, respectively, one or more physical device or computer hardware resources 104, 144, such as one or more processors (CPU), physical memory, network components, or other types of hardware resources. Although, for purposes of illustration, a single client device and media server are shown, in accordance with an embodiment a media server can support the simultaneous use of a plurality of client devices. Similarly, in accordance with an embodiment, a client device can access media content provided by a plurality of media servers, or switch between different media streams produced by one or more media servers.

In some embodiments the client device (e.g. user device 102) transitions between an online mode and an offline mode. The transition can occur for a variety of reasons. One example, such as shown in FIG. 1, is that the user device 102 moves into an area where it no longer has a connection to the Internet, such as on an airplane, in a car, in a remote location, moving out of range of a wireless communication access point, being disconnected from a wired network connection. In another example, the network connection might be turned off (e.g., if the network connection goes down at a scheduled time, such as due to scheduled maintenance or due to a night time curfew). An example of the user device 102 that may transition from the online mode to the offline mode is a smart speaker, such as the Apple® Homepod, Sonos® smart speaker, or one of the Google® Home series of products.

In accordance with an embodiment, the client device can optionally include a user interface 106, which is adapted to display media options, for example as an array of media tiles, thumbnails, or other format, and to determine a user interaction or input. For example, a user input can be made by a touch on a touch screen, or by an audible voice command input to a voice command interface comprising a microphone. Selecting a particular media option, for example a particular media tile or thumbnail, can be used as a command by a user and/or the client device, to the media server, to download, stream or otherwise access a corresponding particular media content item or stream of media content.

In accordance with an embodiment, the client device can also include a media application 108, together with an in-memory client-side media content buffer 110, and a data buffering logic 112. These can be used to control the playback of media content received from the media server, for playing either at a requesting client device (i.e., controlling device) or at a controlled client device (i.e., controlled device), in the manner of a remote control. A connected media environment firmware/logic 120 enables the device to participate within a connected media environment.

In accordance with an embodiment, the data buffering logic, together with the media content buffer, enables a portion of media content items, or samples thereof, to be pre-buffered at a client device. For example, while media options are being prepared for display on a user interface, e.g., as media tiles or thumbnails, their related media content can be pre-buffered at the same time, and cached by one or more client devices in their media content buffers, for prompt and efficient playback when required.

In accordance with an embodiment, the media server system can include an operating system 146 or other processing environment that supports execution of a media server 150 that can be used, for example, to stream music, video, or other forms of media content to a client device, or to a controlled device.

In accordance with an embodiment, the media server can provide a subscription-based media streaming service, for which a client device or user can have an associated account and credentials, and which enable the user's client device to communicate with and receive content from the media server. A received media-access request from a client device can include information such as, for example, a network address, which identifies a destination client device to which the media server should stream or otherwise provide media content, in response to processing the media-access request.

For example, a user may own several client devices, such as a smartphone and an audio speaker, which can play media content received from a media server. In accordance with an embodiment, identifying information provided with a media-access request can include an identifier, such as an IP address, MAC address, or device name, which identifies that the media-access request is intended for use with a particular destination device. This allows a user, for example, to use their smartphone to control a peripheral device, such as an audio speaker, to which media content should be sent. The media server can then send the requested media and/or forward the media-access request to the audio speaker, even though the request originated at the user's smartphone.

In accordance with an embodiment, a media application interface 148 can receive requests from client devices, or from other systems, to retrieve media content from the media server. A context database 162 can store data associated with the presentation of media content by a client device, including, for example, a current position within a media stream that is being presented by the client device, or a playlist associated with the media stream, or one or more previously-indicated user playback preferences. The media server can transmit context information associated with a media stream to a client device that is presenting that stream, so that the context information can be used by the client device, and/or displayed to the user. The context database can be used to store a media device's current media state at the media server, and synchronize that state between devices, in a cloud-like manner. Alternatively, media state can be shared in a peer-to-peer manner, wherein each device is aware of its own current media state that is then synchronized with other devices as needed.

In accordance with an embodiment, when the destination client device to which the media content is being streamed changes, for example from a controlling device to a controlled device, or from a first controlled device to a second controlled device, the media server can transmit context information associated with an active media content to the newly-appointed destination device for use by that device in playing the media content.

In accordance with an embodiment, a media content database 164 can include media content, for example, music, songs, videos, movies, podcasts, or other media content, together with metadata describing that media content. The metadata can be used to enable users and client devices to search within repositories of media content, to locate particular media content items.

In accordance with an embodiment, a buffering logic 180 can be used to retrieve or otherwise access media content items in response to requests from client devices or other systems, and to populate a server-side media content buffer 181, at a media delivery component/streaming service 152, with streams 182, 184, 186 of corresponding media content data, which can then be returned to the requesting device or to a controlled device.

In accordance with an embodiment, a plurality of client devices, media server systems, and/or controlled devices, can communicate with one another using a network, for example the Internet 190, a local area network, peer-to-peer connection, wireless or cellular network, or other form of network. For example, a user 192 can interact 194 with the user interface at a client device and issue requests to access media content. For example, a user request may be for the playing of a selected music or video item at their client device or at a controlled device, or the streaming of a media channel or video stream to their client device or to a controlled device.

In accordance with an embodiment, the user's selection of a particular media option can be communicated 196 to the media server, via the server's media application interface. The media server can populate its media content buffer at the server 204, with corresponding media content 206, including one or more streams of media content data. The media server can then communicate 208 the selected media content to the user's client device, or to the controlled device as appropriate, where it can be buffered in a media content buffer for playing at the device.

In accordance with an embodiment, and as further described below, the system can include a server-side media gateway or access point 220, or other process or component, which operates as a load balancer in providing access to one or more servers, for use in processing requests at those servers. The system can enable communication between a client device and a server via an access point at the server, and optionally the use of one or more routers, to allow requests from the client device to be processed either at that server and/or at other servers.

For example, in a Spotify media content environment, most Spotify clients connect to various Spotify back-end processes via a gateway or access point, which forwards client requests to other servers, such as sending one or more metadata proxy requests to one of several metadata proxy machines on behalf of the client or end user.

Figure 3:
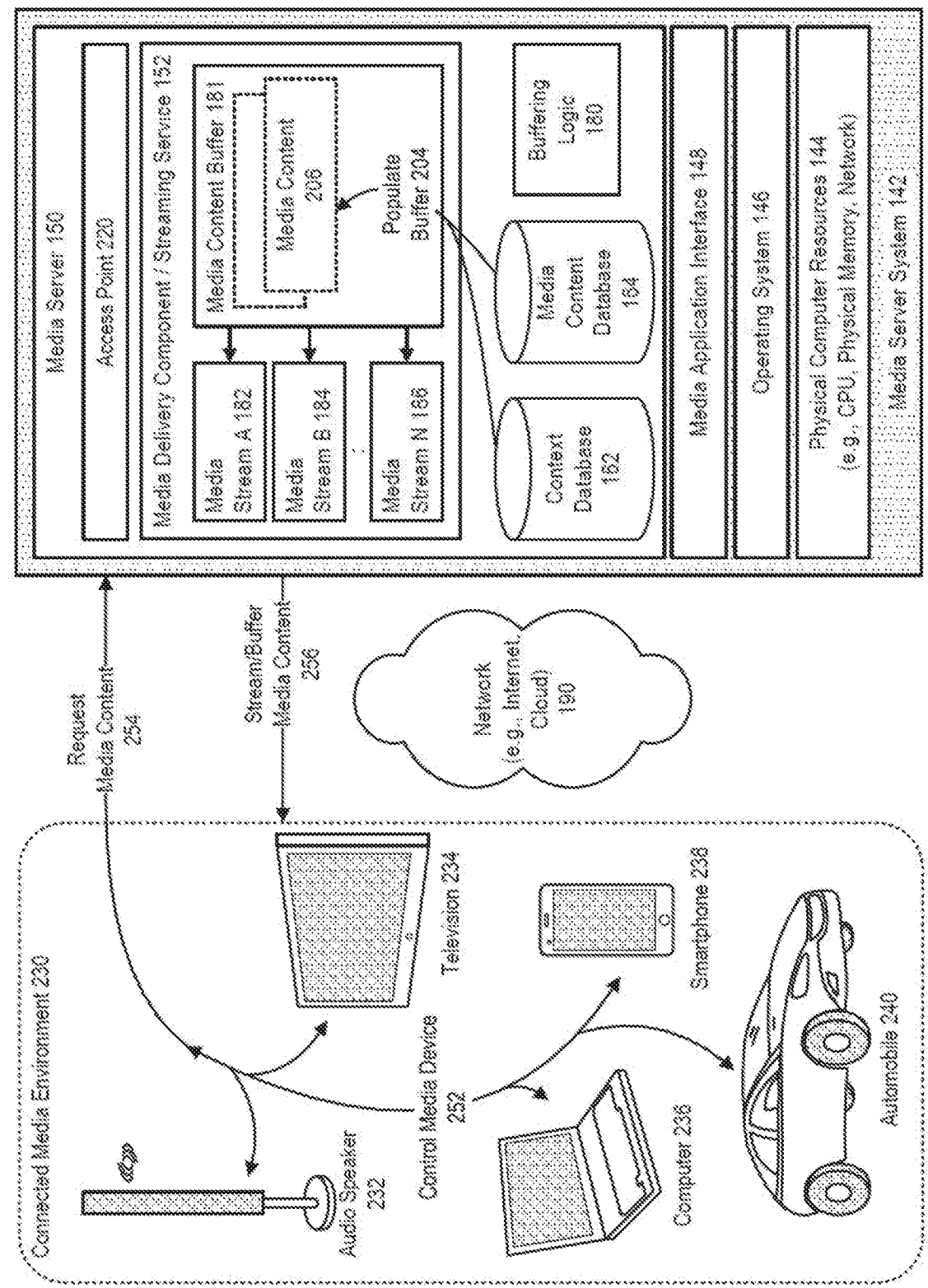
FIG. 3 further illustrates an example of the media-playback system, in accordance with an embodiment.

FIG. 3 further illustrates an example of the media-playback system 100, in accordance with an embodiment. As illustrated in FIG. 3, in accordance with an embodiment, a connected media environment 230, for example a Spotify Connect environment, enables communication between a client device and the server-side access point in a connected manner from the perspective of a user. Examples of the types of media device that can be provided within a connected media environment include audio speakers 232, televisions 234, computers 236, smartphones 238, and in-car entertainment systems 240, or other types of media device.

In accordance with an embodiment, a client device having an application user interface can act as a controlling client device, to control 252 the playback of media content at a controlled device. In accordance with an embodiment, a client device can itself act as a media gateway or access point, for use by other devices within the system 100.

In accordance with an embodiment, a controlled device can also include a media application, which in the case of an audio speaker, television or similar device can be included within the device itself as firmware logic, or within, for example, a separate set-top box or similar after-market device.

As described above, in accordance with an embodiment, a user can interact with the user interface at a client device, and issue requests to access media content. For example, a user request may be for the playing of a selected music or video item at their client device or at a controlled device, or the streaming of a media channel or video stream to their client device or to a controlled device.

For example, in accordance with an embodiment, a user can request that media content be buffered, streamed or received and played at a controlling client device such as a smartphone, and simultaneously buffered, streamed or received for playing at one or more controlled devices, such as an audio speaker. Similarly, for example, the user can issue a media-change request 254 to change a media channel, in response to which the media server can switch the media channel at the controlled device, and thereafter continue to stream or buffer media content 256 for the switched channel, at the controlled device.

As described above, in some instances, a portion of the media content can be pre-buffered at the controlled device, so that the switching to the channel at the controlled device operates in a seamless manner.

Figure 4:
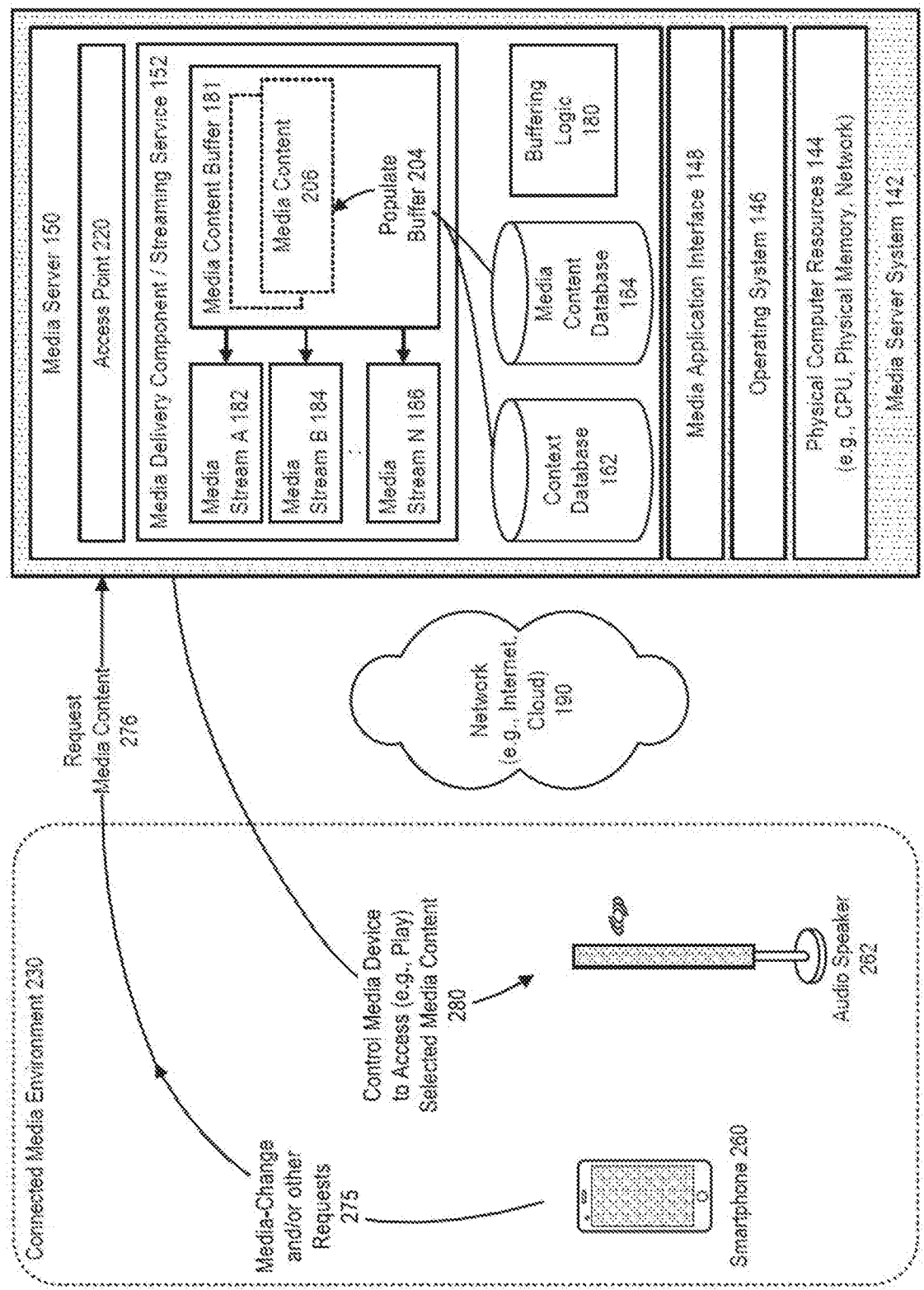
FIG. 4 further illustrates an example of the media-playback system, in accordance with an embodiment.

FIG. 4 further illustrates an example of the media-playback system, in accordance with an embodiment. As illustrated in FIG. 4, a user can utilize, for example, a smartphone 260 in combination with an audio speaker 262, to issue a media-change request 275 from the smartphone, for example, to change a media channel at the audio speaker. The request can be received by the media gateway or access point, and communicated to the local media server, or to other media servers, as a request for media content 276, which can then respond by controlling the destination device (in this example, the audio speaker) to access (e.g., play) the selected media content 280.

As described above, a user device such as media device 102, audio speaker 232, television 234, computer 236, smartphone 238, or in-car entertainment system 240 may not be able to run the most recent update of a shuffle algorithm. This may be because the user device is offline, or in an area of low connectivity, where it may not be possible to receive the latest update. Even if the user device is online, the updating process itself can be a computationally expensive task, as the update must be transmitted to and stored on the device. Furthermore, some user devices may not have optimal processing capabilities to run the algorithm efficiently once it has been updated. For these reasons, it may be problematic for user devices to generate shuffled orders of media content using the latest algorithm.

Figure 5:
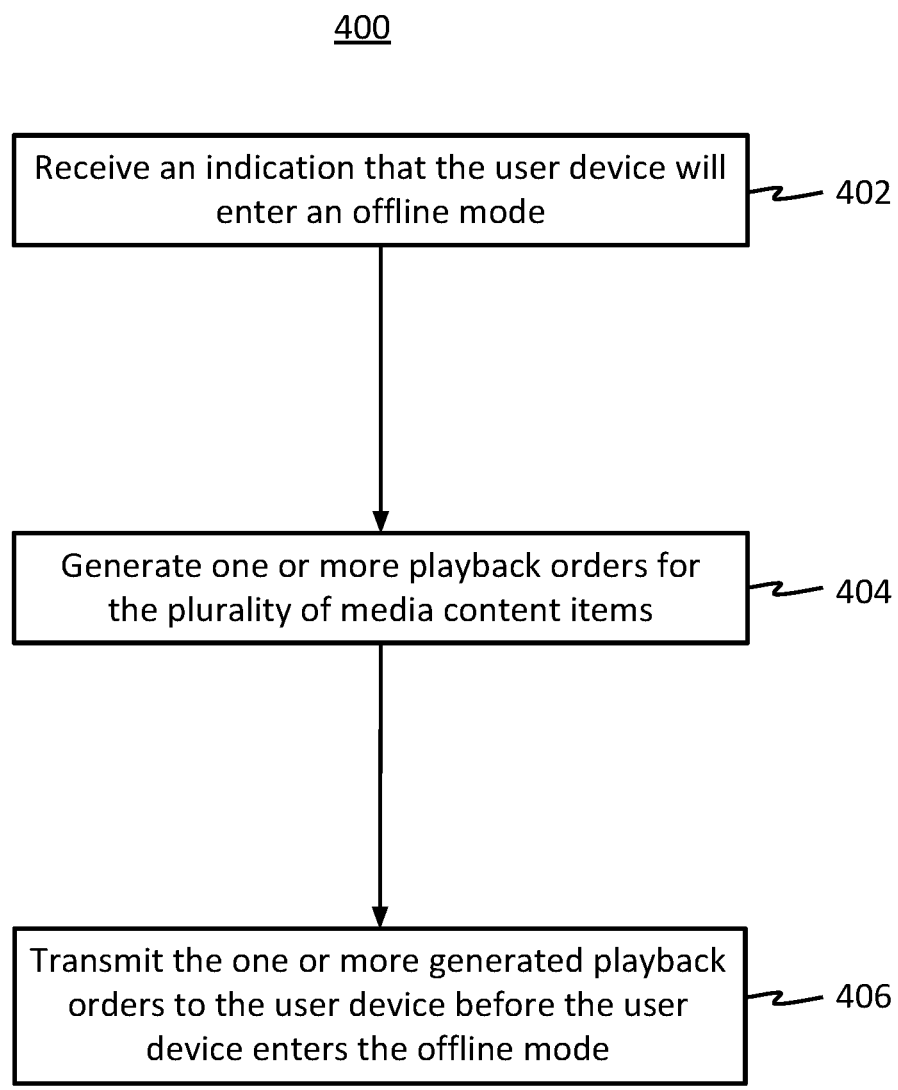
FIG. 5 is a flow diagram showing a method for communicating a playback order for a plurality of media content items to a user device, in accordance with an embodiment.

To address this, FIG. 5 shows a method 400 for communicating a playback order for a plurality of media content items to a user device. The user device is operating in an online mode, and the playback order is communicated before it enters an offline mode. The method is performed at a server system, such as the media server system 142. The user device may be one of the media devices shown in FIGS. 1 to 4, or another type of media device such as a smartwatch, a portable media player, a tablet, or a laptop computer.

The method 400 comprises, at step 402, receiving an indication that the user device will enter an offline mode. The indication can be received from the user device, or can be determined at the server itself.

In some embodiments, a user may make an input to the user device, which causes the device to send a signal to the server. The user input may be a request to download the plurality of media content items. This may be seen as an indication that the user is preparing for a period of offline use of the device, and therefore may need a shuffled order of the content before the device goes offline. The user input may also be an explicit instruction from a user, such as pressing a "prepare for offline mode" button or menu selection, or by responding to a prompt, "Are you going to be going offline soon?". Voice commands and voice prompts can similarly be used. It will be appreciated that other user inputs could be used in other embodiments. For example, the user input could be the start-up of an app, the selection of an artist or playlist, or a shuffle command indicating a wish to shuffle a particular list of media content items. The user input may be made by a touch on a touch screen of the user device, or by an audible voice command input to a voice command interface comprising a microphone of the user device.

In some embodiments, the user device may communicate with other user devices regarding preparation for offlining. For example, a user may use an application on their desktop computer to prepare playlists on a media playback device located in their car for offline playback. As such, the media playback device located in the car may send the indication to the server based on a signal received from another device.

In some embodiments, the indication that the user device will enter an offline mode can comprise a prediction that the user device will go offline. This can be performed at the user device and/or at the server. For example, the user device may be configured to make such a prediction based on location monitoring and current network conditions, such as a detection that the user is driving away from the city into a rural area. In another example, the server could use the location of the device to query for known locations where people often go offline, for example at an airport. In some embodiments, past user behavior may be used to determine when the user device will go offline. For example, if it is known that a user goes offline every Wednesday between 0800 and 0900, for example on a morning run, it can be predicted that the user device will go offline at 0800 on the coming Wednesday. State prediction and caching is described in more detail in European patent application no. 17210871.4 and U.S. patent application Ser. No. 15/721,138 (U.S. Publication No. 2018/0189226), the disclosures of which are hereby incorporated by reference in their entireties.

In some embodiments, it may be desired that a user's favorite playlist is always prepared for offline playback. In some embodiments, a prediction can be made that the user device will enter a region of limited or no network connectivity. For example, destination data that specifies a destination of the user device may be obtained, along with route data that specifies a route from a current location of the user device to the destination. Obtaining the destination data can include providing input data input the user device to a destination prediction engine having a neural network trained to predict a destination, and obtaining the destination as output from the destination prediction engine. A connectivity map can be obtained based on the route data, and one or more areas of limited or no network connectivity along the route can be identified. It can then be predicted when the user device will enter an area of limited or no network connectivity, for example based on the route data and information about the movement or travel of the user device. This is described in more detail in European patent application no. 18170470.1 and U.S. patent application Ser. No. 16/372,495 (U.S. Publication No. 2019/0342419), the disclosures of which are hereby incorporated by reference in their entireties.

At step 404, one or more playback orders are generated for the plurality of media content items. This may be achieved by using a shuffle algorithm that takes a plurality of media content items in a first order and shuffles them into a second order. By implementing the shuffle algorithm at the server, it can be ensured that the most up-to-date shuffle algorithm is used, as the latest updates will have been applied server-side. The need to download and install the latest algorithm at the user device is removed. In other examples, a playback order may be generated in other ways, for example, sorting tracks based on release date, filtering the tracks based on explicit content, or selecting tracks based on licensing conditions (for example rules that a user cannot play a single track more than once per hour, cannot play more than three tracks from the same album in a row, etc.). Other ways of generating playback orders will be readily envisaged by the skilled person.

A shuffle algorithm takes a plurality of media content items in a first order and shuffles them into a second order. The plurality of media content items could be, for example, a playlist, an album, or a list a list of media content items grouped by a particular characteristic such as artist or genre. The first order may be sorted alphabetically, by date, by track number, or by any other suitable sorting criteria known in the art. The second order, different from the first order, is then generated by the shuffle algorithm. In some embodiments, the second order that is generated depends on a seed that is input to the shuffle algorithm. The seed may be a random number, for example generated by a pseudo-random number generator (PRNG) algorithm as known in the art. Alternatively, seeds may be generated in a systematic manner, for example by increasing a previously used seed by a predetermined increment. In some embodiments, the shuffle algorithm is configured such that it generates the same shuffle order if the same seed and the same plurality of media content items are input to the shuffle algorithm. Equally, in most cases, a different seed will produce a different second order. This provides a simple and efficient way for a shuffled order to be recreated. The use of such shuffle algorithms is discussed in more detail in European patent application no. 19158225.3 and U.S. patent application Ser. No. 16/794,572, the disclosures of which are hereby incorporated by reference in their entireties.

To know which media content is to be shuffled, the device running the algorithm may access the list of media content items, or may receive a reference to the list of media content items. In a list of media content items, each media content item may be represented by a Uniform Resource Identifier (URI) and Unique Identifier (UID). The URI identifies a specific media content item, which can be, for example, a music track, a video track or a podcast episode. The UID uniquely identifies a media content item within the list, which can be important when a media content item appears multiple times in a list. In some embodiments, the data structure used for the list is JSON, but could just as well be another data serialization format such as, but not limited to, a Google Protobuf object or XML. A reference to the plurality of media content items may be a Uniform Resource Locator (URL), which is a reference to a location on a computer network from where the list of the plurality of media content can be retrieved. This can be the media content database 164, for example. The URL may include protocol and query information indicating how to access the location, and host information path information indicating the specific location. A URL is a simple text string that allows information to be located and/or accessed without complex, data heavy instructions.

In some embodiments, step 404 of generating the playback orders for the plurality of media content items is performed in response to receiving the indication that the user device will enter the offline mode at step 402. That is to say, in some embodiments the generation of playback orders only occurs when an indication that the user device will enter the offline mode is received. Therefore, shuffled orders are only generated when needed. This reduces processing requirements for the device running the shuffle algorithm, as the algorithm is not run unnecessarily. In other embodiments, playback orders may be generated regardless of whether or not an indication that the user device will enter the offline mode has been received. This means that predetermined playback orders are available for sending as soon as necessary, reducing latency in the system. In this way, the user device may receive a shuffled order as soon as the system is aware that it needs one. This can be useful in cases where the indication does not include information about when the user device will go offline, as a playback order can be sent as soon as possible.

At step 406, the one or more playback orders generated in step 404 are transmitted to the user device before the user device enters the offline mode. In some embodiments, a list of the plurality of media content items, including an index describing the generated playback order, is transmitted to the user device. This can be achieved using a combination of URIs and UIDs, as discussed above. By sending only a list with an index, rather than larger amounts of data such as a full ordered plurality of media content items, memory and bandwidth requirements, as well as transmission times, may be reduced.

As discussed above, playback orders can be generated in the background such that they are ready to be sent as soon as necessary. In this case, the step 406 of transmitting the generated playback order to the user device may be performed in response to receiving the indication that the user device will enter the offline mode at step 402. This means that playback orders can be sent as soon as an indication the user device will enter the offline mode has been received. In this way, the user device may receive a shuffled order as soon as the system is aware that it needs one, which can be useful in cases where the indication does not include information about when the user device will go offline.

In some embodiments, in addition to the media server system 142 sending the playback order to the user device 102, the media server system 142 may also send the media content items to the user device 102, such as when the media content items are not already stored on the user device 102. In some embodiments the media server system 142 determines whether the media content items listed in the playback order are already stored at the user device 102, and sends any needed media content items to the user device 102. In some embodiments the media server system 142 uses the playback order to prioritize sending of media content items based on the playback order. In other words, the media content items that are not already on the user device 102 can be sent to the user device in the same order that they are listed in the playback order. This is beneficial because, for example, the media content items at the beginning of the playback order are more likely to be played than those toward the end of the playback order.

In some cases the user device 102 may enter the offline mode without having all media content items listed in the playback order stored on the user device 102. When that happens, in some embodiments when the user device plays the plurality of media content items based on the playback order, any media content items that are not stored on the user device 102 are skipped.

In the case that more than one playback order is transmitted to the user device, each playback order may be associated with a fitness score. The use of fitness scores may enable the user or the user device to select one of the transmitted playback orders for eventual playback. A fitness score may be determined based on operational parameters relating to the particular shuffled order. This allows for differentiation between the different seeds based on, for example, storage requirements, transmission efficiency, and other parameters relating to operation of a device implementing the shuffle. In some embodiments, the fitness score relating to a playback order associated with a particular seed is determined based on a single operational parameter. In other embodiments, a fitness score relating to a particular seed is determined based on a number of operational parameters, for example as a weighted sum of multiple fitness scores. In some embodiments, the fitness score may be based on properties of the media content items. For example, a fitness score may be based on the even spread of songs by the same artist, tempo, musical key or the track licensor. In one example, a composite fitness score may be determined, which combines the even spread of songs by the same artist and the listening history of the user into a single score that strikes a balance between providing a good spread and not putting too many recently played media content items towards the start of the list. Fitness scores are discussed in more detail in European patent application no. 20159731.7, the disclosure of which is hereby incorporated by reference in its entirety.

As one example, the media server system 142 operates to generate a plurality of playback orders, for the (same) plurality of media content items. In some embodiments, the shuffle order generator 154 analyzes the generated playback orders based on one or more operational parameters. The shuffle order generator then generates one or more fitness scores for each playback order based on the analysis. The fitness scores are then associated with the respective playback orders. Then, in some embodiments, the fitness scores are transmitted to the user device 102, such as along with the playback orders.

As another example, the user device 102 receives the plurality of playback orders, and the fitness scores associated with the playback orders, from the media server system 142. The user device 102 then analyzes the playback orders using the fitness scores and selects one of the playback orders. The user device 102 then initiates playback of the plurality of media content items using the selected one of the playback orders.

In some embodiments, a seed used to generate a given playback order is also transmitted to the user device. The user device can then later install the shuffle algorithm and use the seed to generate the same order. This also allows the user device to forward the seed to other devices that already have the shuffle algorithm installed, such that those devices can generate the shuffle order.

For example, the fitness scores can represent a suitability of the playback order for a given situation. In some embodiments, the user device may analyze characteristics indicative of a current situation (e.g., playback environment or context for media playback), and can then select a shuffle order most suitable to the current situation using the fitness scores.

Other information could also be transmitted to the user device, and this disclosure is not limited to sending only those data items discussed above. For example, if the list of media content items is sorted and/or filtered in some way before the shuffle is performed, the relevant filtering and sorting parameters, indicating how the list was sorted and filtered, may also be sent.

Once a playback order has been transmitted to the user device, the user can begin playback of the media content items in the shuffled order. If the user device is online, the media content items can be streamed from a media server. However, if the user device is offline and has downloaded the necessary media content, then the media content items can still be played back using the shuffled order generated using the latest shuffle algorithm. This allows the user device to recreate the shuffled orders, and play back the media content accordingly, without running the algorithm locally and without having to be online.

The methods disclosed herein send one or more predefined sequences for a set of media content items to a user device before the user device goes offline. The shuffle algorithm is implemented at a server, and one or more resulting orders are generated. It can thus be ensured that the most up-to-date shuffle algorithm is used, and the need to download and install the latest algorithm at the user device is removed. The orders generated at the server can then be sent to the user device when the device is still online. This allows the user device to recreate the shuffled orders, and play back the media content accordingly, without running the algorithm locally and without having to be online. A track list and a set of indices may be sent corresponding to each generated order, rather than sending the tracks themselves, which reduces transmission time and bandwidth requirements. Preparation for the user device to go offline can be triggered by a user request (e.g., a request to download media content before a flight or a run) or based on a prediction of an offline state (e.g., predicting areas of low connectivity along a route to be taken by the user device).

Figure 6:
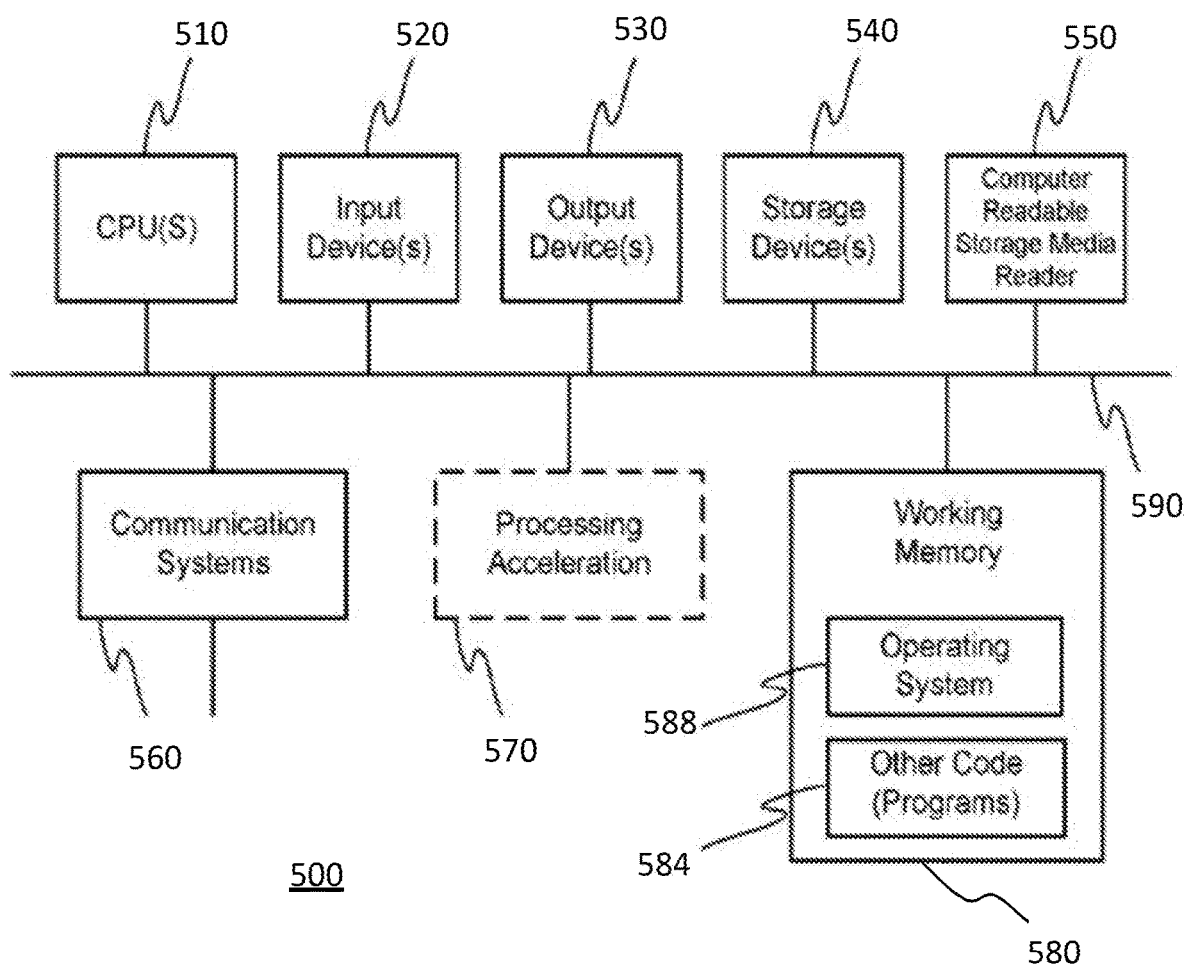
FIG. 6 is a block diagram illustrating an exemplary computer system in which embodiments of the present disclosure may be implemented.

FIG. 6 is a block diagram illustrating an exemplary computer system 500 in which embodiments of the present disclosure may be implemented. This example illustrates a computer system 500 such as may be used, in whole, in part, or with various modifications, to provide the functions of the disclosed system. For example, various functions may be controlled by the computer system 500, including, merely by way of example, generating, determining, identifying, receiving, etc.

The computer system 500 is shown comprising hardware elements that may be electrically coupled via a bus 590. The hardware elements may include one or more central processing units 510, one or more input devices 520 (e.g., a mouse, a keyboard, etc.), and one or more output devices 530 (e.g., a display device, a printer, etc.). The computer system 500 may also include one or more non-transitory computer-readable media such as storage devices 540. By way of example, the storage device(s) 540 may be disk drives, optical storage devices, solid-state storage device such as a random-access memory ("RAM") and/or a read-only memory ("ROM"), which can be programmable, flash-updateable and/or the like.

The computer system 500 may additionally include a computer-readable storage media reader 550, a communications system 560 (e.g., a modem, a network card (wireless or wired), an infra-red communication device, Bluetooth™ device, cellular communication device, etc.), and a working memory 580, which may include RAM and ROM devices as described above. In some embodiments, the computer system 500 may also include a processing acceleration unit 570, which can include a digital signal processor, a special-purpose processor and/or the like.

The computer-readable storage media reader 550 can further be connected to a computer-readable storage medium, together (and, optionally, in combination with the storage device(s) 540) comprehensively representing remote, local, fixed, and/or removable storage devices plus storage media for temporarily and/or more permanently containing computer-readable information. The communications system 560 may permit data to be exchanged with a network, system, computer and/or other component described above.

The computer system 500 may also comprise software elements, shown as being currently located within the working memory 580, including an operating system 588 and/or other code 584. It should be appreciated that alternative embodiments of a computer system 500 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of the computer system 500 may include code 584 for implementing any or all of the function of the various elements of the architecture as described herein. For example, software, stored on and/or executed by a computer system such as the system 500, can provide the functions of the disclosed system. Methods implementable by software on some of these components have been discussed above in more detail.

The various embodiments described above are provided by way of illustration only and should not be construed to limit the claims attached hereto. Those skilled in the art will readily recognize various modifications and changes that may be made without following the example embodiments and applications illustrated and described herein, and without departing from the full scope of the following claims.

What is claimed is:

1. A method for communicating a playback order for a plurality of media content items to a user device operating in an online mode, the method performed at a server system and comprising:
   receiving, at the server system, an indication that the user device will enter an offline mode;
   generating, at the server system, a playback order for the plurality of media content items upon receiving the indication that the user device will enter the offline mode, the generating being based at least in part on a seed; and
   transmitting the seed and the generated playback order to the user device before the user device enters the offline mode.

2. The method of claim 1, wherein the indication that the user device will enter the offline mode is received from the user device.

3. The method of claim 2, wherein the indication the user device will enter the offline mode is based on a user input to the user device.

4. The method of claim 3, wherein the user input is a request to download the plurality of media content items.

5. The method of claim 1, wherein receiving the indication that the user device will enter the offline mode comprises predicting that the user device will enter the offline mode.

6. The method of claim 5, wherein predicting that the user device will enter the offline mode comprises predicting that the user device will enter a region of low connectivity.

7. The method of claim 1, wherein generating the playback order comprises using a shuffle algorithm.

8. The method of claim 7, wherein using the shuffle algorithm comprises applying a reference to the plurality of media content items to the shuffle algorithm.

9. The method of claim 1, wherein transmitting the generated playback order to the user device is performed in response to receiving the indication that the user device will enter the offline mode.

10. The method of claim 1, wherein generating the playback order for the plurality of media content items is performed in response to receiving the indication that the user device will enter the offline mode.

11. The method of claim 1, wherein the user device is a smartphone, a smartwatch, a portable media player, a tablet, or a laptop computer.

12. A non-transitory computer-readable medium having stored thereon instructions that, when executed by one or more processors, cause execution of the method of claim 1.

13. A server system for communicating a playback order for a plurality of media content items to a user device, the server system comprising a processing device, a computer-readable storage device, and a communication device, the computer-readable storage device storing data instructions that, when executed by the processing device, cause the processing device to:
- receive, at the server system, an indication that the user device will enter an offline mode;
- generate, at the server system, a playback order for the plurality of media content items upon receiving the indication that the user device will enter the offline mode, the generating being based at least in part on a seed; and
- transmit the generated playback order to the user device before the user device enters the offline mode.

14. A method of playing a plurality of media content items on a user device, the method comprising:
- operating in an online mode, and while operating in the online mode:
  - sending an offlining indication to a server system using the communication device, the offlining indication containing data indicative that the user device will enter an offline mode; and
  - receiving from the server system a playback order for a plurality of media content items, the playback order being generated at the server system; and
- entering the offline mode after receiving the playback order, and while operating in the offline mode:
  - initiating playback of the plurality of media content items based on the playback order.

* * * * *